United States Patent
Park et al.

(10) Patent No.: US 9,248,855 B2
(45) Date of Patent: Feb. 2, 2016

(54) STEERING SYSTEM FOR WHEELED CONSTRUCTION EQUIPMENT

(75) Inventors: Hyung-Seok Park, Changwon-si (KR); Sung-Yong Jo, Changwon-si (KR)

(73) Assignee: VOLVO CONSTRUCTION EQUIPMENT AB (SE)

( * ) Notice: Subject to any disclaimer, the term of this patent is extended or adjusted under 35 U.S.C. 154(b) by 0 days.

(21) Appl. No.: 14/364,272

(22) PCT Filed: Dec. 13, 2011

(86) PCT No.: PCT/KR2011/009567
§ 371 (c)(1),
(2), (4) Date: Jun. 10, 2014

(87) PCT Pub. No.: WO2013/089287
PCT Pub. Date: Jun. 20, 2013

(65) Prior Publication Data
US 2014/0332309 A1 Nov. 13, 2014

(51) Int. Cl.
*B62D 5/09* (2006.01)
*B62D 6/00* (2006.01)
(Continued)

(52) U.S. Cl.
CPC .............. *B62D 5/062* (2013.01); *B62D 5/093* (2013.01); *B62D 6/007* (2013.01); *E02F 9/225* (2013.01)

(58) Field of Classification Search
CPC ........ B62D 5/0487; B62D 5/06; B62D 5/083; B62D 5/09; B62D 5/22; B62D 5/30; B62D 6/00
USPC .......... 180/417, 421, 422, 428, 439, 441, 442
See application file for complete search history.

(56) References Cited

U.S. PATENT DOCUMENTS

| 7,040,445 B2 | 5/2006 | Ishii et al. |
| 2003/0201134 A1 | 10/2003 | Ishii et al. |

(Continued)

FOREIGN PATENT DOCUMENTS

| JP | 54-090726 A | 7/1979 |
| JP | 2003-312528 A | 11/2003 |

(Continued)

OTHER PUBLICATIONS

International Search Report (in Korean and English) and Written Opinion (in Korean) for PCT/KR2011/009567, mailed Sep. 28, 2012; ISA/KR.

(Continued)

*Primary Examiner* — Joseph Rocca
*Assistant Examiner* — Marc A Scharich
(74) *Attorney, Agent, or Firm* — Harness, Dickey & Pierce, P.L.C.

(57) ABSTRACT

Disclosed is a steering system which is capable of ensuring that a wheeled excavator travels straight while being driven on a paved road. The steering system for wheeled construction equipment includes: a hydraulic oil pump; a steering motor connected to the hydraulic oil pump; a steering valve controlling the operation of the steering motor; a steering handle operating the steering motor and the steering valve according to steering manipulation by the driver; and a steering cylinder steered by the manipulation of the steering handle. The steering system further includes an idle mode control unit which converts working mode into a steering mode not having straight line driving recovery performance when working mode, in which working and driving are enabled, is selected, and which converts exclusive driving mode into a steering mode having the straight line driving recovery performance through a signal input when the exclusive driving mode, in which only driving is enabled, is selected.

2 Claims, 2 Drawing Sheets

(51) Int. Cl.
*B62D 5/06* (2006.01)
*B62D 5/093* (2006.01)
*E02F 9/22* (2006.01)

(56) References Cited

U.S. PATENT DOCUMENTS

2008/0116001 A1* 5/2008 Graeve et al. ................. 180/441
2011/0108353 A1 5/2011 Byrd et al.
2013/0276441 A1 10/2013 Bae et al.
2013/0289835 A1 10/2013 Bae et al.

FOREIGN PATENT DOCUMENTS

KR 20-1991-0007838 Y1 10/1991
KR 10-0151532 B1 9/1998

OTHER PUBLICATIONS

Extended European Search Report issued by European Patent Office on Nov. 12, 2015 in Application No. 11877216.9 (7 pages).

* cited by examiner

STEERING SYSTEM FOR WHEELED CONSTRUCTION EQUIPMENT

FIELD OF THE INVENTION

The present invention relates to a steering system for a wheel type construction machine. More particularly, the present invention relates to a steering system for a wheel type construction machine, which can ensure driving straightness when a wheeled excavator is driven on a paved road.

BACKGROUND OF THE INVENTION

In general, a wheel type construction machine can be driven on a paved road, and can perform a work at a construction work site. However, only a steering system suited to the work is applied at the construction work site. In other words, when a steering handle for a wheel type construction machine is manipulated, a driving or traveling direction of the machine is set. On the other hand, when the steering handle is not manipulated, the driving or traveling direction is fixed.

For this reason, accuracy of the work is increased and an impact is not transmitted to the steering handle when the construction machine travels on an irregular road surface so that safety of an operator can be ensured. On the contrary, when the wheel type construction machine travels on a paved road due to the absence of a driving straightness restoring force, various driving operations are required to control the traveling direction during the traveling of the machine, and thus an operator suffers from a fatigue sensation.

A steering system for a wheel type construction machine in accordance with the prior art as shown in FIG. 1 includes:

a hydraulic pump 1 that is connected to an engine (not shown);

a steering motor 2 that is connected to the hydraulic pump 1;

a steering valve 3 that is installed in a flow path between the hydraulic pump 1 and the steering motor 2 and is shifted to control a start, a stop, and a direction change of the steering motor 2;

a steering handle 4 that operates the steering motor 2 and the steering valve 3 in response to an operator's steering manipulation; and a steering cylinder 6 that steers the machine operation by changing a direction of wheels 5 by means of a hydraulic fluid that is supplied from the hydraulic pump 1 through the manipulation of the steering handle 4.

When the steering handle 4 is rotatably manipulated in a clockwise direction or a counter-clockwise direction, the steering valve 3 is shifted and the hydraulic fluid discharged from the hydraulic pump 1 can be supplied to the steering cylinder 6 via the steering motor 2.

In this case, when a spool of the steering valve 3 is shifted to the left on the drawing sheet (i.e., shifted to a first position 3*a*), the hydraulic fluid discharged from the hydraulic pump 1 is supplied to one-side chamber 6*a* of the steering cylinder 6 via the steering valve 3 and the steering motor 2 so that the machine is steered to the right. On the contrary, when the spool of the steering valve 3 is shifted to the right on the drawing sheet (i.e., shifted to a second position 3*b*), the hydraulic fluid discharged from the hydraulic pump 1 is supplied to the other-side chamber 6*b* of the steering cylinder 6 via the steering valve 3 and the steering motor 2 so that the machine is steered to the left. That is, the traveling direction of the machine is controlled by changing a direction of the wheels 5 linkably connected to the steering cylinder 2.

In the meantime, when the steering valve 3 is in a neutral mode (i.e., in a neutral position 3*c*), a flow path between the steering motor 2 and the steering cylinder 6 is blocked in a disconnected fashion. For this reason, since a force from the wheels 5 is not transmitted to the steering motor 2, the steering system entails a problem in that it does not have a driving straightness restoring force.

DETAILED DESCRIPTION OF THE INVENTION

Technical Problems

Accordingly, the present invention has been made to solve the aforementioned problem occurring in the prior art, and it is an object of the present invention to provide a steering system for a wheel type construction machine, in which when a wheeled excavator or the like is driven on a paved road, the number of manipulations of a steering handle for the machine can be minimized to ensure driving straightness, thereby reducing an operator's fatigue sensation.

Technical Solution

To accomplish the above object, in accordance with an embodiment of the present invention, there is provided a steering system for a wheel type construction machine, including a hydraulic pump connected to an engine, a steering motor connected to the hydraulic pump, a steering valve installed in a flow path between the hydraulic pump and the steering motor and configured to control the drive of the steering motor, a steering handle configured to operate the steering motor and the steering valve in response to an operator's steering manipulation, and a steering cylinder configured to steer the machine by changing a direction of wheels by means of a hydraulic fluid that is supplied from the hydraulic pump through the manipulation of the steering handle, the steering system comprising:

a neutral mode control means configured to perform the shift of a mode to a steering mode in which a driving straightness restoring force is absent when a working mode is selected in which both a working operation and a traveling operation can be performed, and perform the shift of a mode to a steering mode in which the driving straightness restoring force is present in response to a traveling mode signal applied thereto when a traveling-dedicated mode is selected in which only the traveling operation can be performed.

In accordance with a preferred embodiment of the present invention, the steering valve may have a port which is internally provided with a first neutral mode position shifted to block a flow path between the steering cylinder and the steering motor when the working mode is selected in which both the working operation and the traveling operation can be performed, and a second neutral mode position shifted to connect the flow path between the steering cylinder and the steering motor in response to the traveling mode signal applied thereto when the traveling dedicated mode is selected in which only the traveling operation can be performed.

The steering valve may be shifted to the first neutral mode position when the steering handle is in a neutral position, and may be shifted to the second neutral mode position when the traveling mode is selected.

The steering valve is connected at one side to the other end of a link connected at one end to the steering motor, and is connected at the other side to the neutral mode control means 17.

Advantageous Effect

The steering system for a wheel type construction machine in accordance with an embodiment of the present invention as constructed above has the following advantages.

When a work is performed using a wheeled excavator at a construction work site, a steering system suited to the work is applied at the construction work site so that accuracy of the work and safety of an operator can be ensured. Meanwhile, when the construction machine is driven on a paved road, the number of manipulations of a steering handle for the machine can be minimized owing to a steering system having a driving straightness restoring force. On the other hand, when the construction machine is driven on a curved surface of the paved road, driving straightness is restored even with a small manipulation force by the driving straightness restoring force after passing through the curved road surface, thereby reducing an operator's fatigue sensation.

BRIEF DESCRIPTION OF THE DRAWINGS

The above objects, other features and advantages of the present invention will become more apparent by describing the preferred embodiments thereof with reference to the accompanying drawings, in which.

EXPLANATION ON REFERENCE NUMERALS OF MAIN ELEMENTS IN THE DRAWINGS

Figure 1:
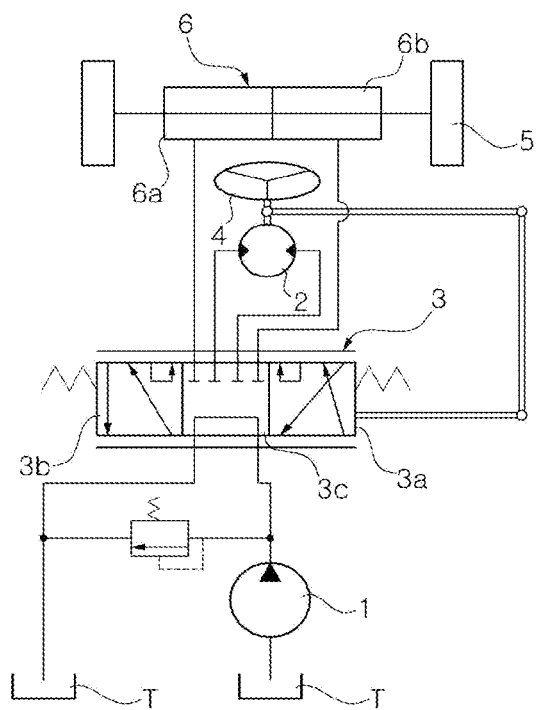
FIG. 1 is a hydraulic circuit diagram showing a steering system for a wheel type construction machine in accordance with the prior art.

11; hydraulic pump
12; steering motor
13; steering valve
14; steering handle
15; wheels
16; steering cylinder
17; neutral mode control means
18; link

Preferred Embodiments of the Invention

Now, preferred embodiments of the present invention will be described in detail with reference to the accompanying drawings. The matters defined in the description, such as the detailed construction and elements, are nothing but specific details provided to assist those of ordinary skill in the art in a comprehensive understanding of the invention, and the present invention is not limited to the embodiments disclosed hereinafter.

Figure 2:
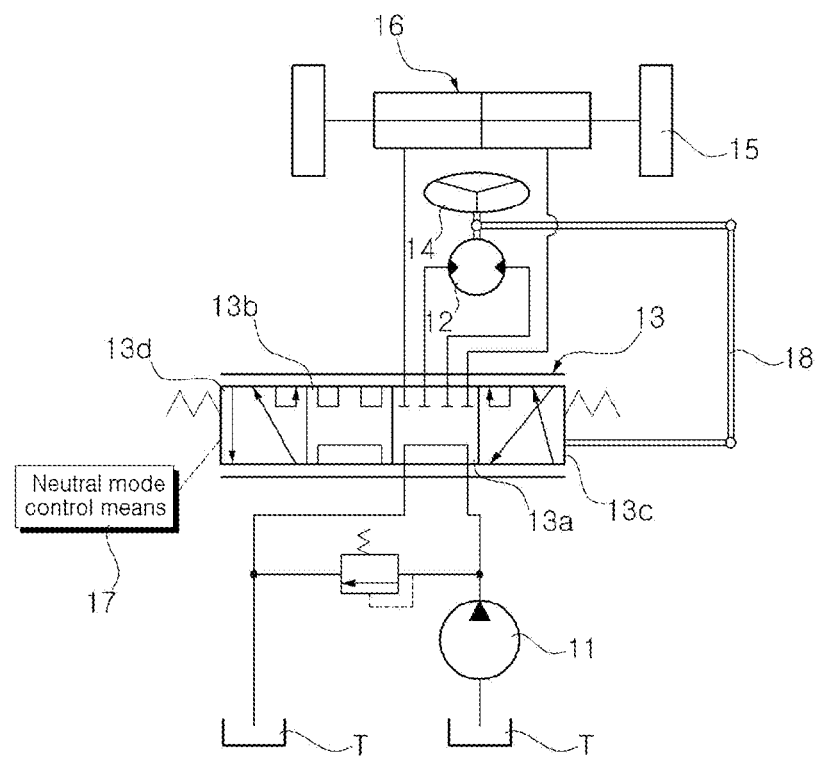
FIG. 2 is a hydraulic circuit diagram showing the steering operation when a working mode is selected in a steering system for a wheel type construction machine in accordance with an embodiment of the present invention.
Figure 3:
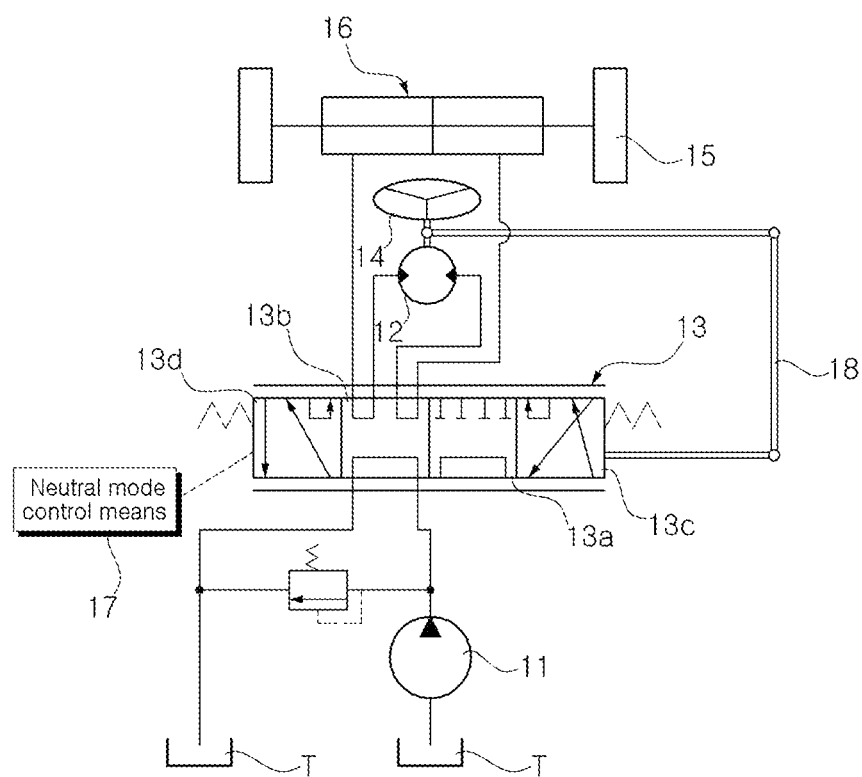
FIG. 3 is a hydraulic circuit diagram showing the steering operation when a traveling-dedicated mode is selected in a steering system for a wheel type construction machine in accordance with an embodiment of the present invention.

A steering system for a wheel type construction machine in accordance with an embodiment of the present invention as shown in FIGS. 2 and 3 includes a steering system for a wheel type construction machine, including a hydraulic pump 11 that is connected to an engine (not shown), a steering motor 12 that is connected to the hydraulic pump 11, a steering valve 13 that is installed in a flow path between the hydraulic pump 11 and the steering motor 12 to control the drive of the steering motor 12, a steering handle 14 that operates the steering motor 12 and the steering valve 13 in response to an operator's steering manipulation, and a steering cylinder 16 that steers the machine by changing a direction of wheels 15 by means of a hydraulic fluid that is supplied from the hydraulic pump 11 through the manipulation of the steering handle 14, the steering system comprising:

a neutral mode control means 17 that performs the shift of a mode to a steering mode in which a driving straightness restoring force is absent when a working mode is selected in which both a working operation and a traveling operation can be performed, and performs the shift of a mode to a steering mode in which the driving straightness restoring force is present in response to a traveling mode signal applied thereto when a traveling-dedicated mode is selected in which only the traveling operation can be performed.

In this case, the steering valve 13 has a port which is internally provided with a first neutral mode position 13a shifted to block a flow path between the steering cylinder 16 and the steering motor 12 when the working mode is selected in which both the working operation and the traveling operation can be performed, and a second neutral mode position 13b shifted to connect the flow path between the steering cylinder 16 and the steering motor 12 in response to the traveling mode signal applied thereto when the traveling dedicated mode is selected in which only the traveling operation can be performed.

The steering valve 13 is shifted to the first neutral mode position 13a when the steering handle 14 is in a neutral position, and is shifted to the second neutral mode position 13b when the traveling mode is selected.

The steering valve 13 is connected at one side to the other end of a link connected at one end to the steering motor 12, and is connected at the other side to the neutral mode control means 17.

Hereinafter, the operation of a steering system for a wheel type construction machine in accordance with an embodiment of the present invention will be described in detail with reference to the accompanying drawings.

A) In the case where a working mode is selected in which a working operation and a traveling operation can be performed, i.e., no traveling mode signal is applied to the neutral mode control means 17, the steering operation will be described below.

As shown in FIG. 2, when an operator selects a working mode in which both the working operation and the traveling operation can be performed (i.e., the working mode is applied to the steering system in which a driving straightness restoring force is absent), the steering valve 13 maintains the first neutral mode position 13a. Thus, a hydraulic fluid discharged from the hydraulic pump 11 is drained to a hydraulic tank T so that a flow path between the steering motor 12 and the steering cylinder 16 is blocked. In this case, a force from the wheels 15 is not transmitted to the steering motor 12, and thus the driving straightness restoring force is not present in the steering system.

Meanwhile, when the operator manipulates the steering handle 14 to shift the steering valve 13 to a steering position 13c or 13d through a link 18 linkably connected to the steering handle 14, the hydraulic fluid from the hydraulic pump 11 can be supplied to the steering cylinder 16 via the steering motor 12. Thus, the drive of the steering cylinder 16 can change a direction of the wheels 15 linkably connected to the steering cylinder 16 to determine the traveling direction.

B) In the case where a traveling dedicated mode is selected in which only the traveling operation can be performed, i.e., a traveling mode signal is applied to the neutral mode control means 17, the steering operation will be described below.

As shown in FIG. 3, when the operator selects a traveling-dedicated mode in which only the traveling operation can be performed (i.e., the traveling-dedicated mode is applied to the steering system in which a driving straightness restoring force is present), the steering valve 13 maintains the second neutral mode position 13b in response to a control signal outputted from the neutral mode control means 17 in response to a traveling mode signal applied to the neutral mode control means 17.

Thus, although the hydraulic fluid discharged from the hydraulic pump 11 is drained to the hydraulic tank T, the flow path between the steering motor 12 and the steering cylinder 16 is connected. In this case, a force from the wheels 15 is transmitted to the steering motor 12. Therefore, when the machine travels on a paved road, the steering system has a driving straightness restoring force by virtue of the characteristics in which the wheels 15 positioned at the left and right sides of the steering cylinder 16 are to be aligned in a straight direction.

Meanwhile, a configuration in which when the operator manipulates the steering handle 14 to shift the steering valve 13, the hydraulic fluid from the hydraulic pump 11 is supplied to the steering cylinder 16 to drive the steering cylinder 16 is the same as that in the steering operation as shown in FIG. 2. Thus, the detailed description of the configuration will be omitted to avoid redundancy.

INDUSTRIAL APPLICABILITY

As described above, according to the present invention as constructed above, when a wheeled excavator performs a work, a steering system suited to the work can ensure accuracy of the work and safety of an operator. In addition, when the construction machine is driven on a paved road, the number of manipulations of a steering handle for the machine can be minimized owing to a steering system having a driving straightness restoring force. On the other hand, when the construction machine is driven on a curved surface of the paved road, driving straightness is restored even with a small manipulation force by the driving straightness restoring force after passing through the curved road surface, thereby reducing an operator's fatigue sensation.

The invention claimed is:

1. A steering system for a wheeled construction machine, the steering system comprising:
 a hydraulic pump configured to be operably connected to an engine;
 a steering motor operably connected to the hydraulic pump;
 a steering cylinder configured to operably pivot wheels of the construction machine upon receiving hydraulic fluid;
 a steering handle configured to operate the steering motor and a steering valve in response to an operator's steering manipulation of the steering handle;
 wherein the steering valve is disposed in a hydraulic fluid flow path between the hydraulic pump and the steering motor to control drive of the steering motor, the steering valve is movable between:
 a first steering position in which the steering valve directs hydraulic fluid from the hydraulic pump to a first side chamber of the steering cylinder to pivot the wheels in a first direction;
 a second steering position in which the steering valve directs hydraulic fluid from the hydraulic pump to a second side chamber of the steering cylinder by way of the steering motor to pivot the wheels in a second direction opposite to the first direction;
 a first neutral position in which the steering valve blocks hydraulic fluid flow from the hydraulic pump to the steering motor, and blocks hydraulic fluid flow from the steering motor to the steering cylinder such that force from the wheels is not transmitted to the steering motor and driving straightness restoring force is not provided to the wheels;
 a second neutral position in which the steering valve blocks hydraulic fluid flow from the hydraulic pump to the steering motor, and permits hydraulic fluid flow between the steering cylinder and the steering motor such that force from the wheels is transmitted to the steering motor to provide driving straightness restoring force to the wheels;
 a link connecting the steering motor and the steering valve to shift the steering valve between the first steering position and the second steering position; and
 a neutral mode controller configured to shift the steering valve between the first neutral position and the second neutral position;
 wherein:
  the steering valve is moved to the first neutral position by the neutral mode controller when the steering handle is in a neutral position and a working mode is selected by an operator of the construction machine in which both a working operation and a traveling operation can be performed by the construction machine; and
  the steering valve is moved to the second neutral position by the neutral mode controller when a travel-dedicated mode is selected by the operator of the construction machine in which a traveling operation and not a working operation can be performed.

2. The steering system of claim 1, wherein the link and the neutral mode controller are connected to the steering valve at opposite sides of the steering valve.

* * * * *